(12) United States Patent
Parker et al.

(10) Patent No.: US 6,644,265 B2
(45) Date of Patent: Nov. 11, 2003

(54) ELECTRO-HYDRAULIC MANIFOLD ASSEMBLY AND METHOD OF MAKING SAME FOR CONTROLLING DE-ACTIVATION OF COMBUSTION CHAMBER VALVES IN A MULTICYLINDER ENGINE

(75) Inventors: Kenneth J. Parker, Lake Orion, MI (US); Jorge A. Moreno, Auburn Hills, MI (US); Chuck Chang, Troy, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/119,402

(22) Filed: Apr. 9, 2002

(65) Prior Publication Data

US 2003/0188710 A1 Oct. 9, 2003

(51) Int. Cl.⁷ .............................................. F02D 13/06
(52) U.S. Cl. ................................. 123/198 F; 123/90.16
(58) Field of Search ......................... 123/198 F, 90.33, 123/90.38, 90.12, 90.16

(56) References Cited

U.S. PATENT DOCUMENTS

| | | | | |
|---|---|---|---|---|
| 4,249,489 A | * | 2/1981 | Bruder et al. | 123/198 F |
| 4,615,307 A | | 10/1986 | Kodama et al. | 123/90.16 |
| 4,671,221 A | | 6/1987 | Geringer et al. | 123/90.16 |
| 4,696,265 A | | 9/1987 | Nohira | 123/90.16 |
| 4,793,307 A | | 12/1988 | Quenneville | 123/323 |
| 5,163,389 A | * | 11/1992 | Fujikawa et al. | 123/198 F |
| 5,673,658 A | | 10/1997 | Allmendinger | 123/90.12 |
| 5,787,855 A | * | 8/1998 | Mueller et al. | 123/198 F |
| 5,970,956 A | | 10/1999 | Sturman | 123/508 |
| 6,173,685 B1 | | 1/2001 | Sturman | 123/90.12 |
| 6,223,846 B1 | | 5/2001 | Schechter | 180/165 |
| 6,227,154 B1 | | 5/2001 | Wakeman | 123/90.16 |
| 6,257,183 B1 | | 7/2001 | Vorih et al. | 123/90.12 |
| 6,412,461 B2 | * | 7/2002 | Nakashima | 123/198 F |
| 6,439,176 B1 | | 8/2002 | Payne et al. | 123/90.12 |
| 6,481,409 B1 | * | 11/2002 | Wade et al. | 123/198 F |

* cited by examiner

Primary Examiner—Henry C. Yuen
Assistant Examiner—Jason Benton
(74) Attorney, Agent, or Firm—Roger A. Johnston (57) ABSTRACT

A solenoid valve and manifold assembly for installation on an engine and connecting with hydraulic circuits in the engine for de-actuating the combustion chamber valves of selected cylinders of the engine. A manifold deck is formed with the valving channels and ports therein for connecting to the hydraulic circuits. A gasket is formed with solenoid valve mounting bosses and valving passages as a unitary member and is retained on the manifold deck by a retaining plate preferably stamped from sheet stock with clearance holes received over the valve mounting bosses and secured to the manifold deck over the gasket for sealing the gasket thereon. The valves are inserted in the bosses and retained by a preferably stamped bracket and the bracket, retaining plate and gasket secured to the manifold deck by common fasteners. A common electrical lead frame is received over the valve terminals for making electrical connection to the valves. The assembly of valves and the manifold deck may then be attached to the engine as a unit.

22 Claims, 9 Drawing Sheets

ELECTRO-HYDRAULIC MANIFOLD ASSEMBLY AND METHOD OF MAKING SAME FOR CONTROLLING DE-ACTIVATION OF COMBUSTION CHAMBER VALVES IN A MULTICYLINDER ENGINE

TITLE OF INVENTION

An Electro-Hydraulic Manifold Assembly And Method Of Making Same For Controlling De-Activation Of Combustion Chamber Valves In A Multi-Cylinder Engine.

BACKGROUND OF THE INVENTION

The present invention relates to an electrically operated valve and manifold assembly for controlling flow of hydraulic fluid in a circuit for deactivating the hydraulic lash adjusters or valve lifters in an internal combustion engine. In certain multi-cylinder motor vehicle engine applications, it has been desired to deactivate the combustion chamber valves of the engine for purposes of disabling combustion in certain of the cylinders during light load or "low throttle" applications in order to increase efficiency, conserve fuel and reduce the emissions from the engine combustion chambers. It has also been found that disabling the operation of some of the cylinders enables the remaining cylinders to operate at a higher throttle or load condition which reduces the air flow or "pumping" losses which would otherwise occur over a nearly closed air throttle.

Where the engine valves are operated from a camshaft, such as by hydraulic valve lifters or lash adjusters through direct action for overhead cam arrangements or through intermediate linkages such as rocker arms, finger followers or push rods or other types of engine valve gear arrangements, the valves may be left close by hydraulically disabling the valve lift function.

In such arrangements, an electrically operated valve opens a flow of hydraulic fluid, typically engine lubricant, through a separate channel or circuit to cause hydraulic movement of the lash adjusters to a position preventing movement of the engine valves.

In engines where such valve de-actuation is employed, in order to simplify the final assembly of the engine and installation of the electric valves for de-actuating the valve lifters, it has been desired to provide an assembly of a manifold and the valves for deactivating respectively the desired cylinder which may be mounted as a unit on the engine during engine buildup. Heretofore, such an arrangement has required two separate manifold plates usually cast of aluminum material with subsequently machined surfaces formed on the castings in order to provide the appropriate passages for valving the lubricant to the valve lifters and to provide a mounting arrangement for the individual electric valves to connect to the respective hydraulic circuit and to facilitate the manifold and valve assembly as a unit onto the engine.

Figure 4:
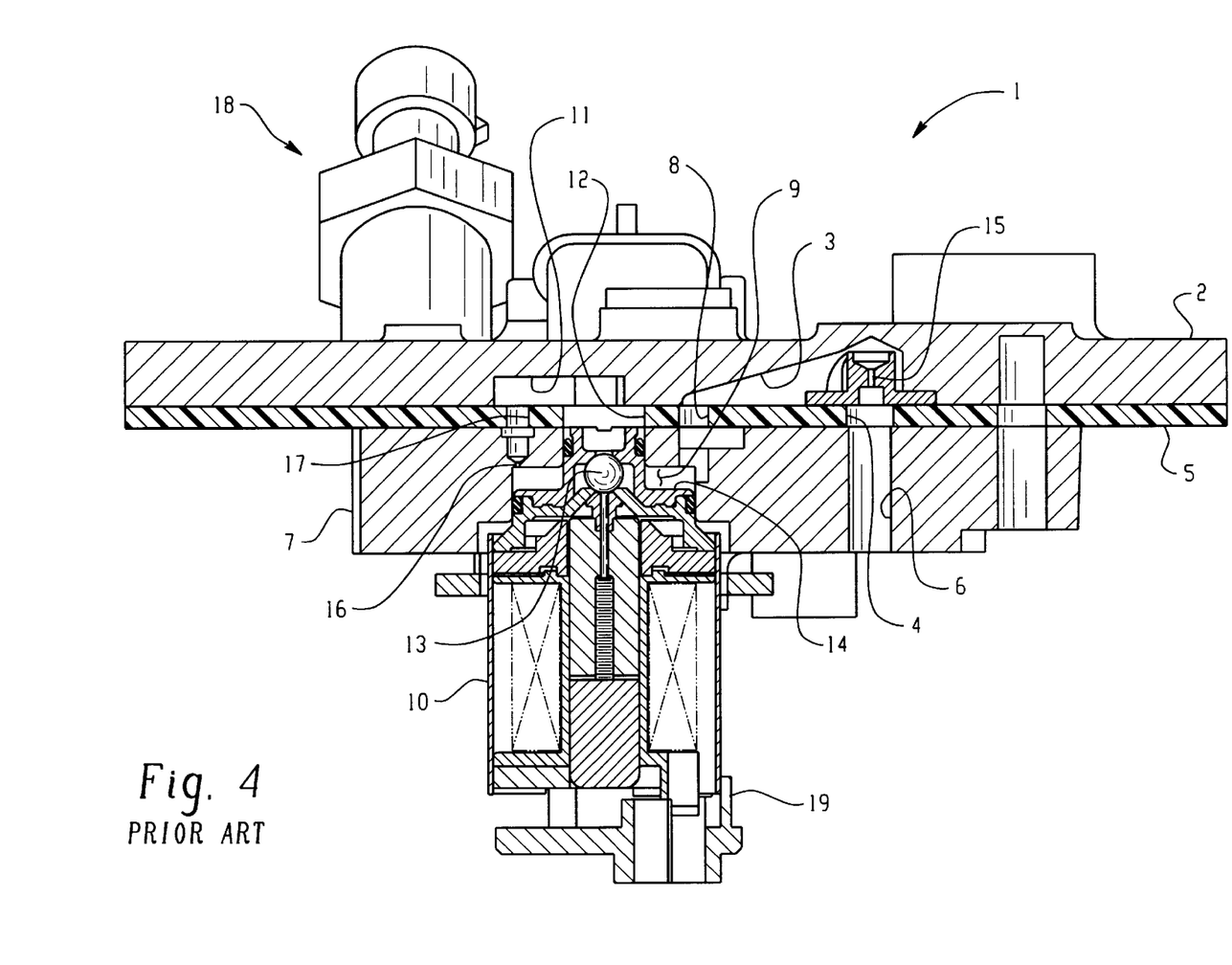
FIG. 4 is a section view similar to FIG. 1 of a Prior Art valve and manifold subassembly.
Figure 5:
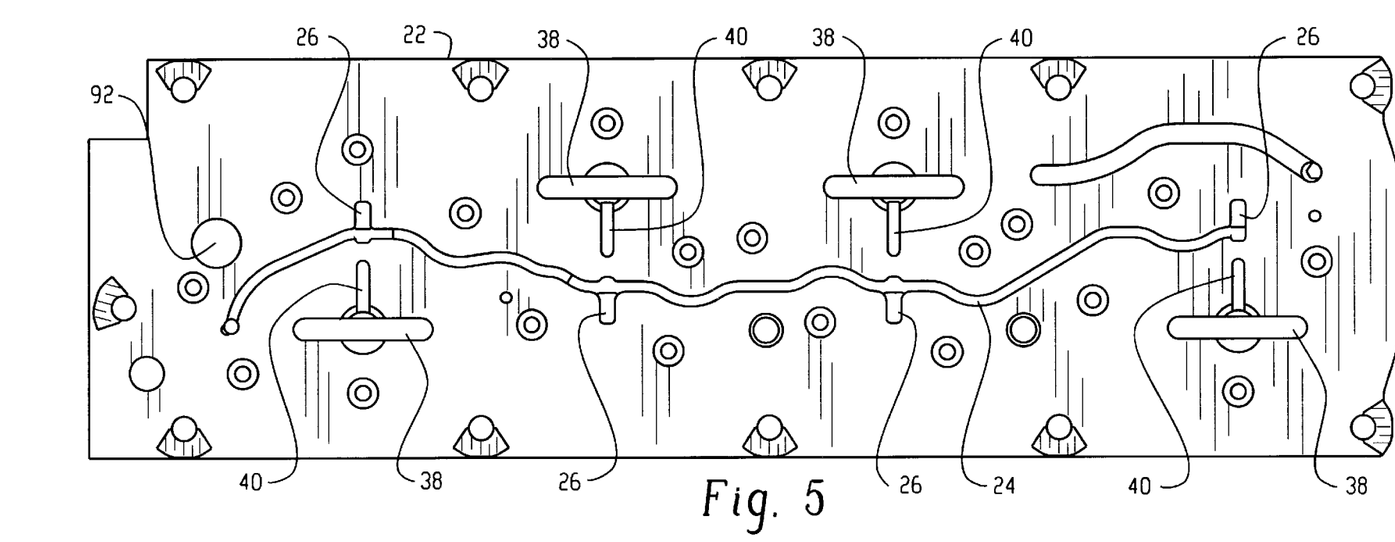
FIG. 5 is a bottom view of the manifold upper deck of the subassembly of FIG. 1.
Figure 6:
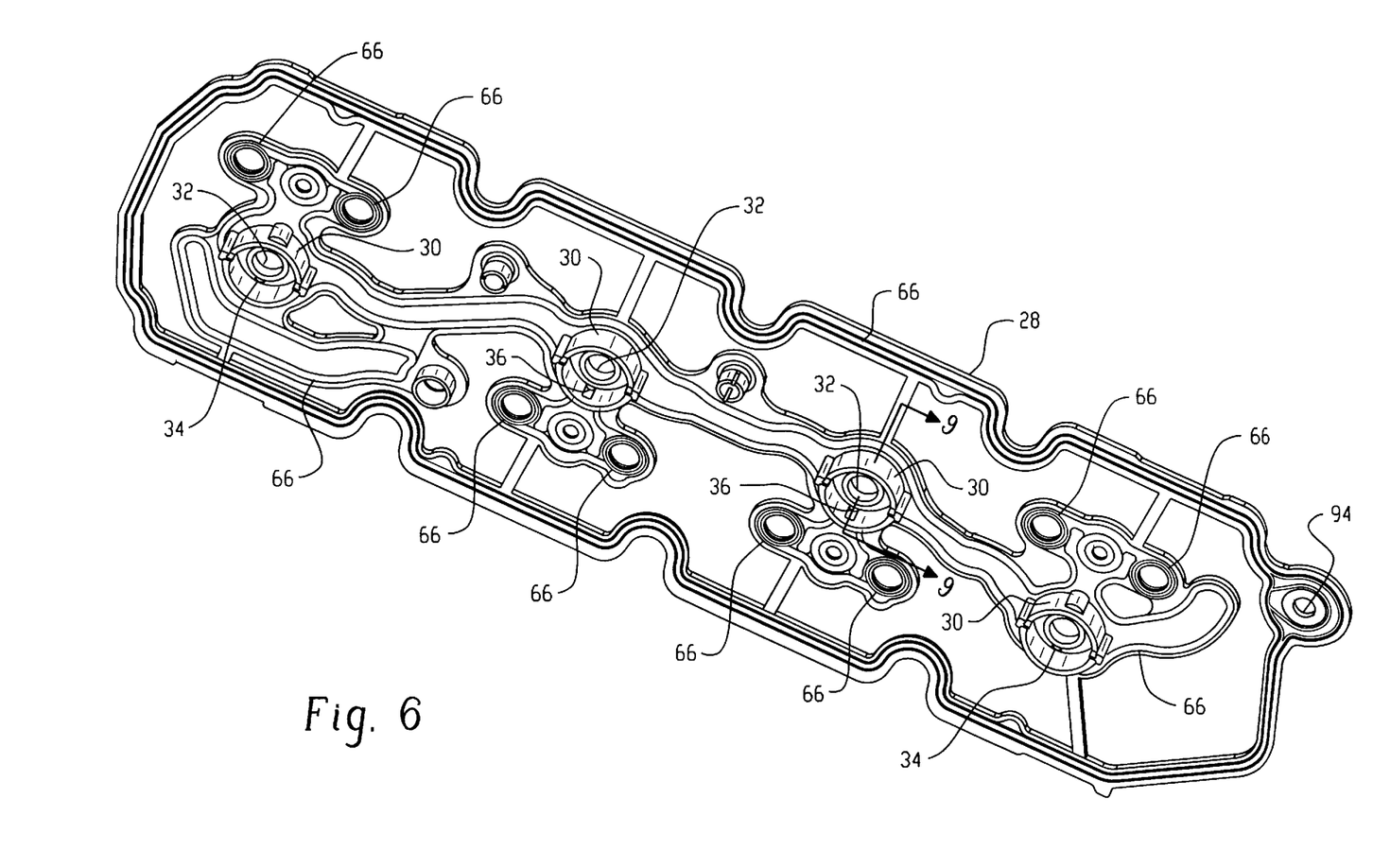
FIG. 6 is a perspective view of the underside of the upper deck sealing gasket.
Figure 7:
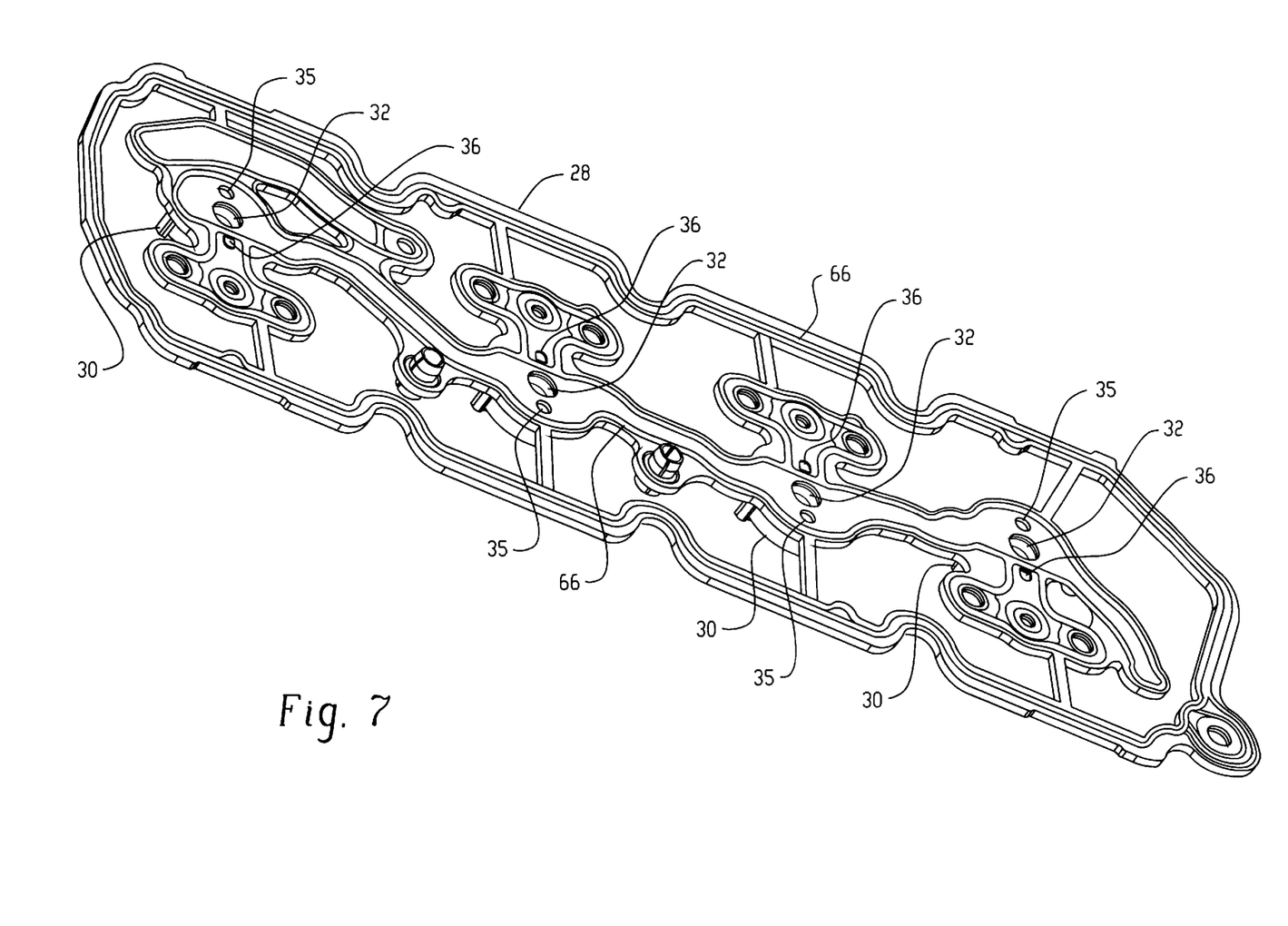
FIG. 7 is a perspective view of the top side of the upper deck sealing gasket.
Figure 8:
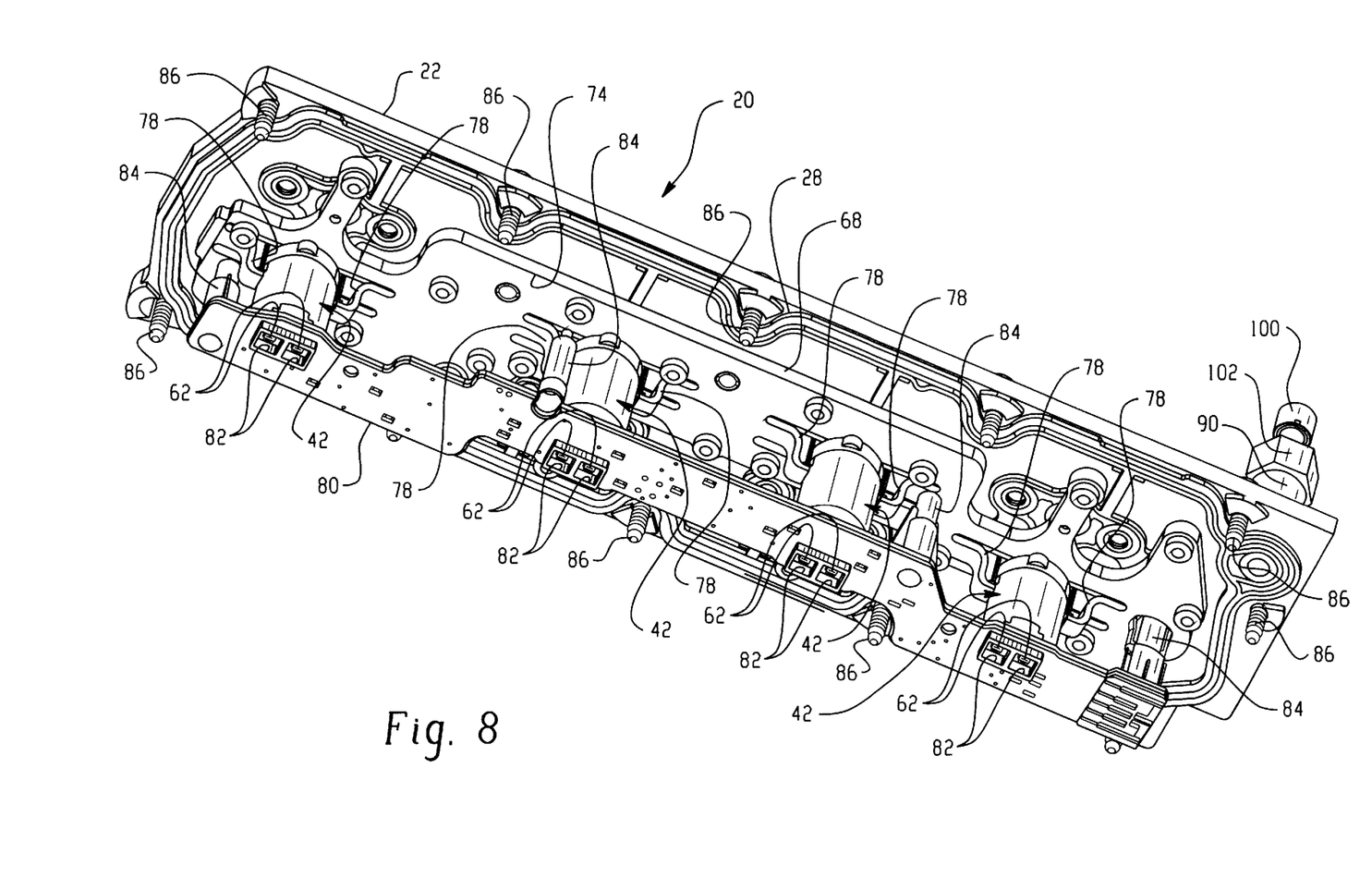
FIG. 8 is a perspective view of a portion of the entire manifold subassembly of FIGS. 3a and 3b; and, FIG. 9 is an enlarged view of a section taken along section-indicating lines 9—9 of FIG. 6.

Such a known arrangement is shown in FIG. 4 wherein the valve and manifold assembly indicated generally at 1 includes an upper manifold plate or deck 2 having a channel 3 formed therein which communicates through an aperture 4 in a gasket 5 disposed over the undersurface of the deck 2. Gasket aperture 4 communicates with an inlet port 6 provided in a lower manifold plate or deck 7 which is adapted for connecting to an hydraulic circuit on the engine block (not shown). Channel 3 communicates through a second aperture 8 formed in the gasket 5 which aperture 8 communicates with a valving chamber 9 having an electrically operated valve 10 mounted on the lower deck 7 for valving flow from channel 3 to a channel 11 which supplies an outlet port (not shown) for the respective valve to be de-actuated.

In operation, pressurized fluid is provided in a supply channel 3 formed in the undersurface of upper deck 2 through inlet port 6 in the lower deck; and, the supply channel communicates through an aperture 8 in the gasket to valving chamber 9. Upon energization, solenoid 10 effects movement of a valve member 13 from its valve seat and permits flow through the gasket aperture 12 which communicates with outlet channel 11 formed in the undersurface of the upper deck 2. Channel 11 communicates with respective control pressure port apertures in the gasket (not shown) for de-actuating the respective engine valves and also communicates through a flow limiting bypass gasket port 17 and bypass orifice 16.

A bleed orifice 16 is provided in the lower deck 7; and, orifice 16 communicates with a bypass aperture 17 in gasket 5 which communicates with the supply channel 11 to provide a highly restricted and limited bleed flow to bypass the valve and return to an unshown sump. An electrical lead frame 9 is provided for electrical connection to the solenoid 10.

The known arrangement shown in FIG. 4 has thus required two separately machined manifold decks or plates and has proven to be prohibitively costly and heavy for high volume production motor vehicle applications.

Thus, it has been desired to provide a way or means of reducing the weight and cost of the electric valve and hydraulic manifold assembly for controlling the de-actuation of the combustion chamber valves in a multi-cylinder motor vehicle engine.

BRIEF SUMMARY OF THE INVENTION

The present invention provides a solution to the above-described problem and employs an electric valve and manifold assembly having an upper manifold plate with lubricant or hydraulic fluid passages therein which has disposed over the underside thereof, with ports formed therein for communicating with the corresponding fluid passages and a gasket which has formed integrally thereon mounting surfaces forming a valving chamber with the manifold deck and providing valve mounting cavities. Electrically operated valves are mounted directly on the gasket mounting cavities; and, the gasket is retained by a simple flat plate and the valves retained on the gasket mounting cavities by a stamped bracket which is attached through the gasket to the manifold deck. The assembly of the present invention thus eliminates the need for a separate secondary or lower manifold deck having machined hydraulic passages therein. The present invention reduces the overall cost and weight of the manifold assembly and simplifies the fabrication thereof yet preserves the function of attaching a single unit to an engine for effecting electrically controlled deactivation of the engine valve lifters.

DETAILED DESCRIPTION OF THE INVENTION

Referring to FIGS. 1 through 3 and 5 through 8, the manifold and valve assembly of the present invention is indicated generally at 20 and includes an upper deck 22 which has on the undersurface thereof a fluid supply channel 24 which extends along the length thereof and communicates with four individual side channels 26 spaced thereal­ong for supplying hydraulic fluid from a port 25 which, upon installation of the assembly 20 into the vehicle engine, to a source (not shown) of pressurized lubricant from the engine lubricating oil pump.

Figure 9:
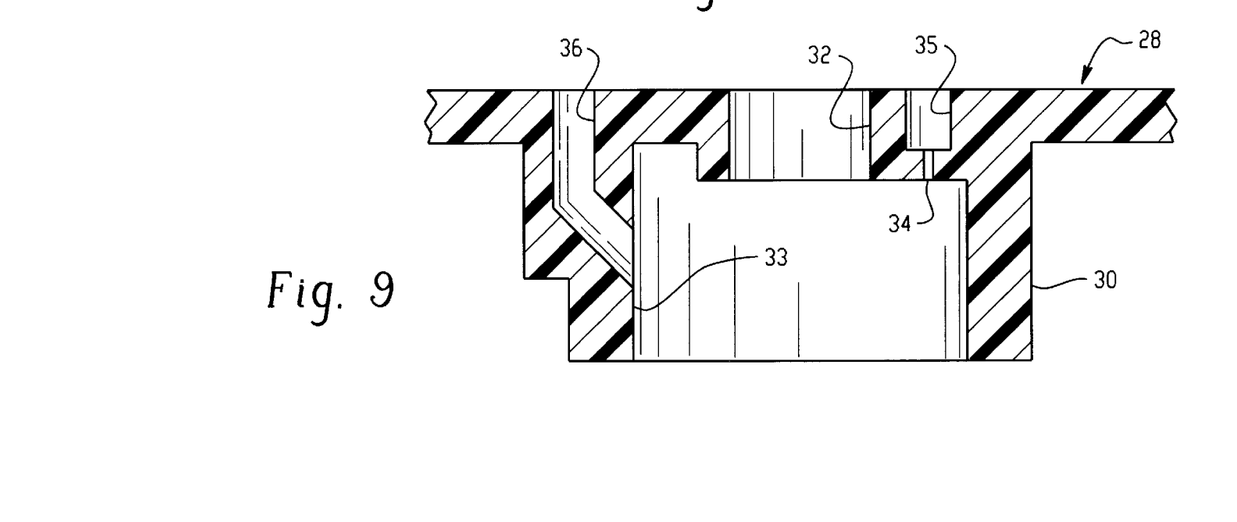

A combination gasket and valve mounting member 28 has formed thereon a plurality of valve mounting bosses 30, a typical one of which is shown in cross section in FIG. 9, each of which has an aperture 32 formed therethrough for communicating with the supply channel 24 and a bleed orifice 34 which communicates with one of the side channels 26 for providing bypass flow around the valve through an outlet port 36 which communicates with a channel 38 formed in the undersurface of deck 22 and which each include a side channel 40. The enlarged opening port 35 formed in the gasket for each of the bleed orifices 34 communicates with one of the inlet side channels 26. Each of the bosses 30 has a cavity therein defining a valve mounting surface 33 for receiving a solenoid valve sealingly engaged therein as will be later described.

In the presently preferred practice, the upper deck 22 is formed of cast aluminum material and the gasket 28 is formed of polyamide material fractionally filled with glass particulate; as, for example, one-third glass fill by volume, although other fractions of fill may be employed, and other suitable engineered resinous materials besides polyamide may be used.

Figure 1:
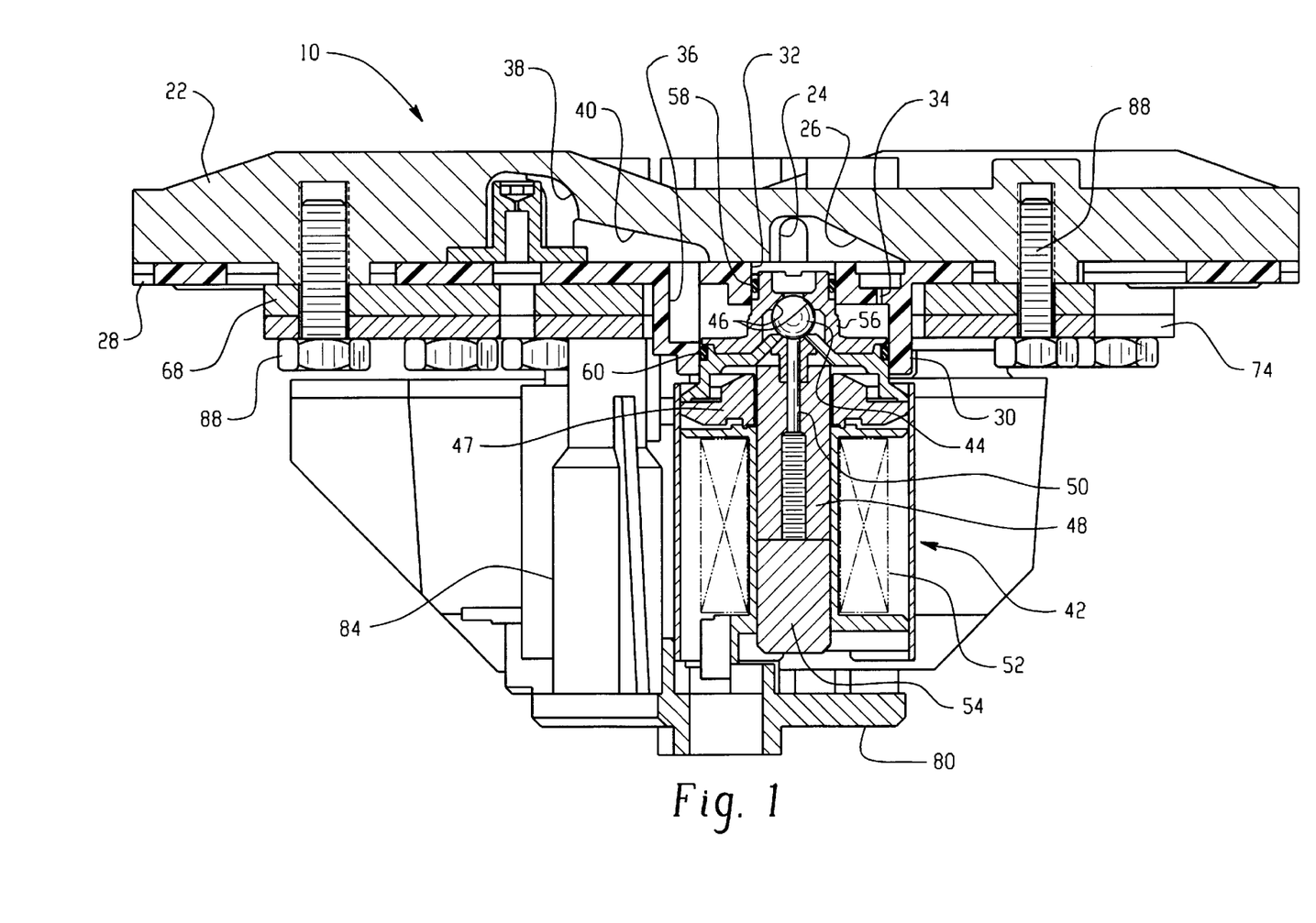
FIG. 1 is a cross-section through one of the valves in the assembly of the present invention.
Figure 2:
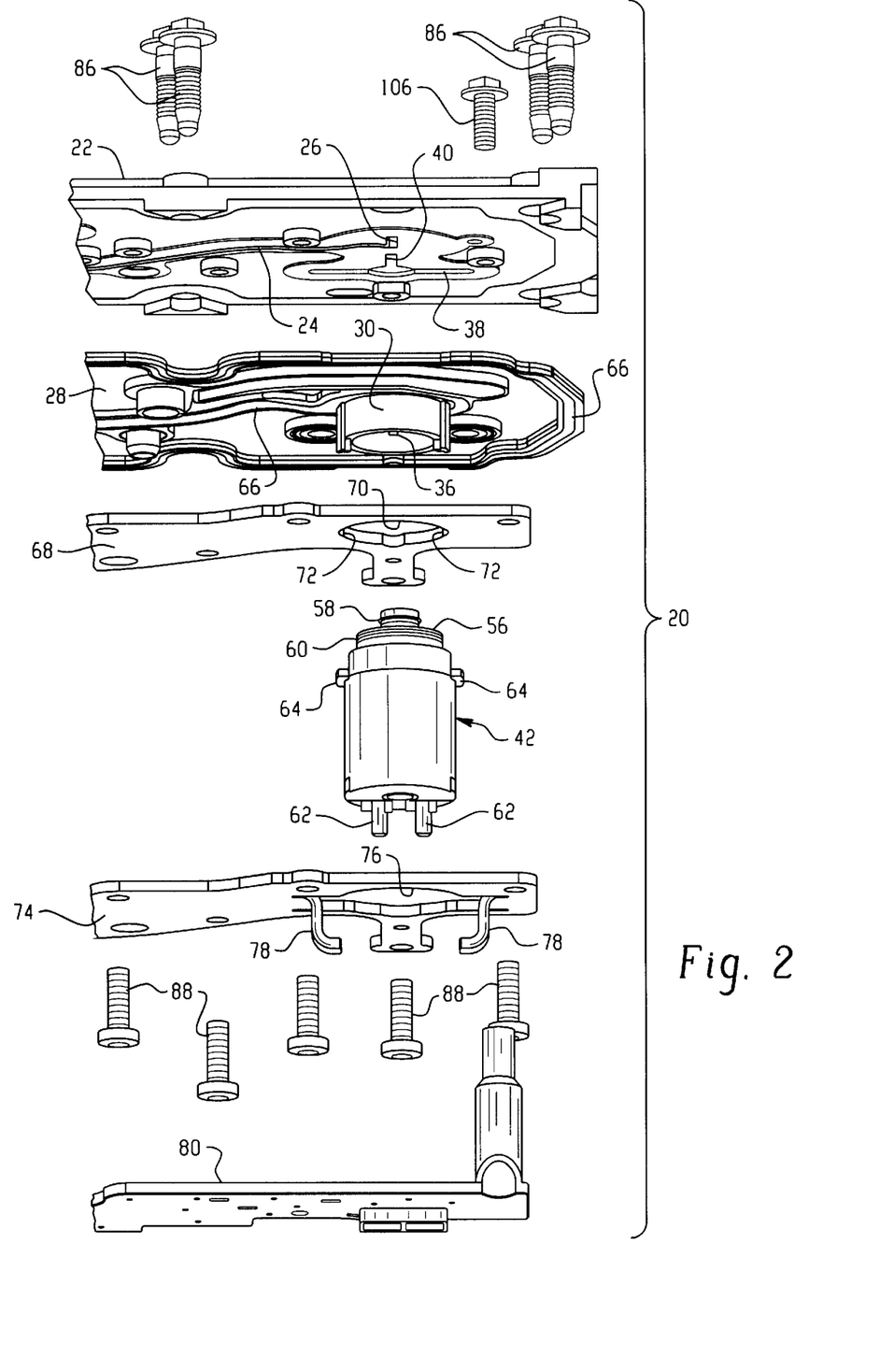
FIG. 2 is an exploded view of one of the electrically operated valves in a portion of the manifold assembly with the valve thereon.
Figure 3A:
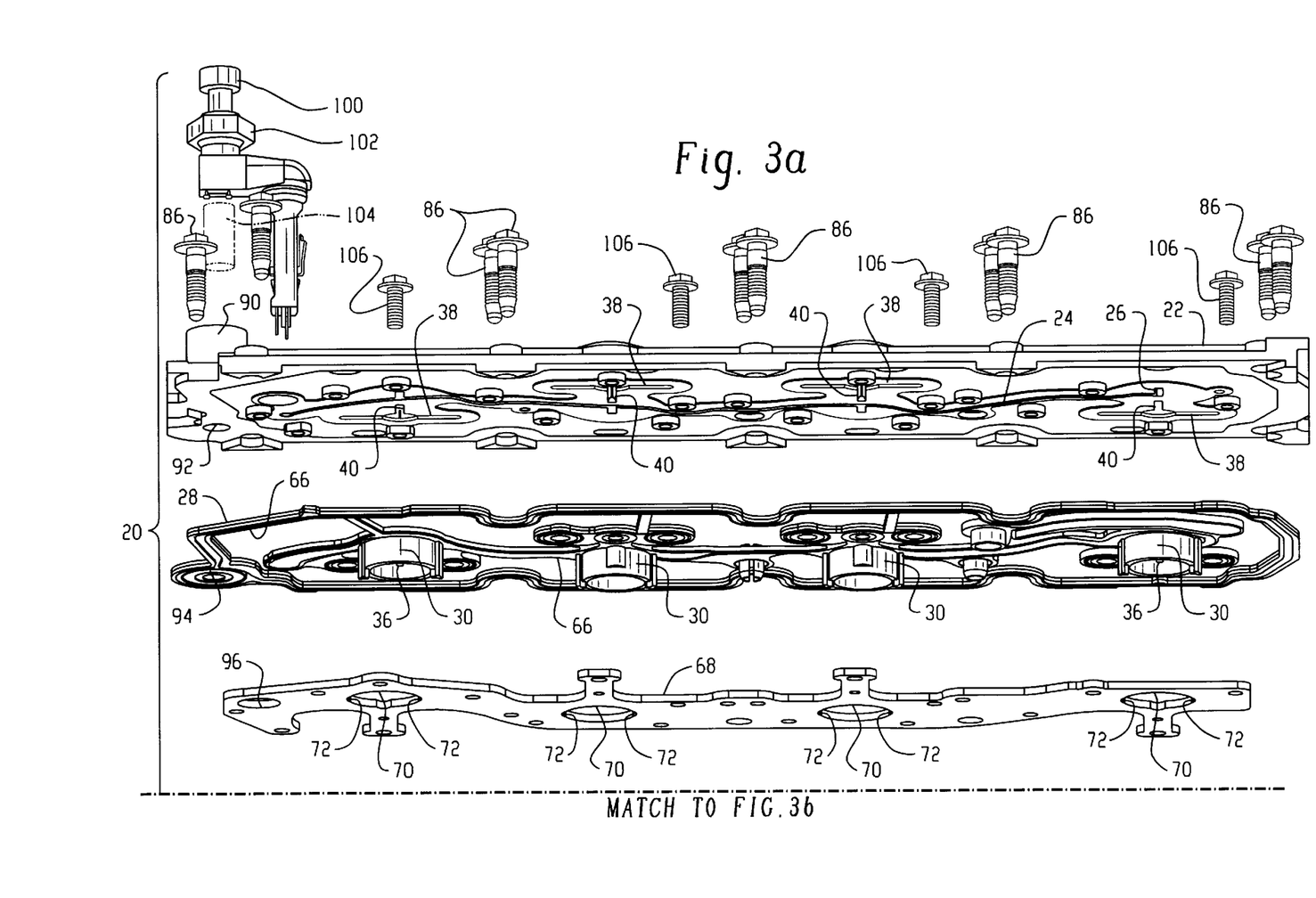
FIGS. 3a and 3b together comprise the complete exploded view of the valves and manifold subassembly of the present invention as embodied for selectively disabling the valves of four cylinders of an engine.
Figure 3B:
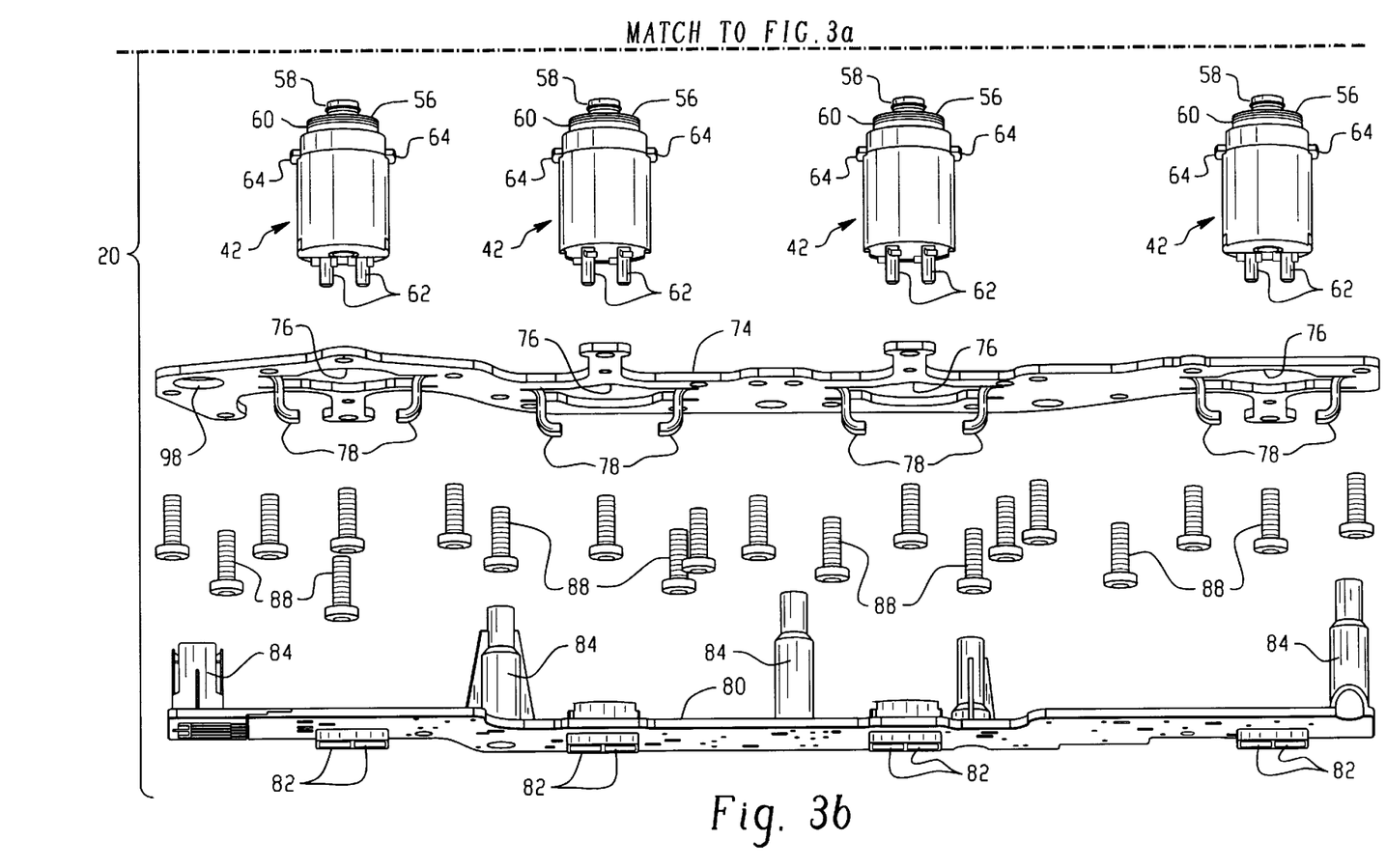

Referring to FIGS. 1, 2 and 3b, a solenoid operated valve indicated generally at 42 includes a moveable valve member in the form of a ball 44 which is registered against a valve seat 46 which communicates with the inlet aperture 32 formed in the gasket 28. The valve seat 46 is formed in member 56 attached to the valve body 47 which includes a moveable armature 48 with a rod 50 contacting the ball member 44 for effecting movement thereof and a coil 52 surrounding the armature and a stationary pole piece 54. The valve seat is formed in a member 56 attached to the valve body 47 and member 46 has a seal ring 58 disposed thereover for sealing in the aperture 32 in the gasket; and, a second O-ring 60 is provided on the valve body for sealing in the boss 30.

The valve 42 includes electrical terminals 62 which extend downwardly therefrom for external attachment thereto in a manner as will be hereinafter described. The valve body 47 includes a pair of outwardly extending lugs 64 for orienting and retaining the valve in the boss 30 in a manner as will hereinafter be described.

Referring to FIG. 2, 3a, and 6 through 8, the gasket has a bead of suitable resilient sealing material provided around the periphery and the ports thereof as denoted by reference numeral 66; and, in the presently preferred practice of the invention the sealing material comprises silicone elastomer; however, it will be understood that other sealing materials may be employed.

Referring to FIGS. 2, 3a, and 6 through 8, the gasket 28 is registered against the undersurface of deck 22 and is sealed and retained thereon by a retainer plate 68 which, in the presently preferred practice of the invention may be stamped from sheet stock and requires no subsequent machining operations. The plate 68 has clearance apertures 70 provided therein for permitting the solenoid operated valve 42 to be inserted in the boss 30 through the aperture 70 in the plate. The lugs 64 engage slots 72 provided on opposite sides of each of the aperture 70 to orient the valve 42 such that the electrical terminals 62 are aligned for subsequent simultaneous interconnection thereto.

Referring to FIGS. 1, 2, 3b and 8, a valve retaining bracket 74 with clearance apertures 76 provided therein is received over the retaining plate 68 with each of the apertures 76 received over one of the valves 42. The bracket 74 is preferably formed also by stamping from sheet stock and has a pair of preferably integrally formed projections 78 extending downwardly therefrom on opposite sides of the clearance aperture 76. Each of the projections 78 engages one of the lugs 64 on the valve 42 for retaining the valve in the boss 30 and seal rings 58, 60 engaged in the inner surfaces of the boss into which the valve is assembled.

Referring to FIGS. 1, 2, 3b, and 8, an electrical lead frame 80 is commonly received over all of the solenoid valves 42 with the electrical terminal 62 of each valve 42 engaged in an appropriately located slot 82 provided on the lead frame in preferably bayonet-type or push-on engagement. It will be understood that the lead frame 80 has embedded therein appropriate electrical circuit conductors (not shown), portions of which are exposed (not shown) in each of the slots 82, such that the terminals 62 make electrical connection therewith upon the aforesaid bayonet engagement. The lead frame has an electrical connector receptacle 84 provided at one end thereof which has electrical pins (not shown) provided therein which are connected to the internal circuit connector members of the lead frame in a manner well known in the art; and, upon attachment of a wiring harness connector (not shown) to the receptacle 84, each of the solenoids may be controlled by an unshown remote controller.

The lead frame 80 has spaced stanchions 84 provided on the upper side thereof, each of which is located over cut outs provided in the edge of bracket 74 and the retaining plate 68; and, apertures are provided in the gasket 28 and the upper deck 22 such that suitable fasteners such as screws 86 (see FIG. 3a) may engage the end of the stanchions 84 in threaded engagement to retain the lead frame 80 securely attached to the valve electrical terminals.

It will be understood that the bracket 74, retaining plate 68, gasket 28 and deck plate 22 are retained together by fasteners such as screws 88 received through appropriately located apertures formed in the bracket 74, retaining plate 68, with the screws 88 threadedly engaging the upper deck 22.

Referring to FIG. 3a, the upper deck 22 has a boss 90 provided thereon which has provided therethrough a filling passage 92 which communicates through aperture 94 in gasket 28, a correspondingly located aperture 96 in retaining plate 68 and aperture 98 in bracket 74. If desired, a filter 104, shown in dashed outline, may be inserted in port 92. A correspondingly located filling passage (not shown) is provided in the engine structure onto which the manifold subassembly is mounted, as for example, by a correspondingly located stanchion provided on the engine.

The boss 90, has a removable cap 100 provided on a fitting 102 which is attached to 4 the boss 30.

Upon installation of the manifold subassembly 20 onto the engine the valve lifter de-actuation circuit is filled through the fitting 90 and port 92. Cap 102 is installed on fitting 90 to seal port 92.

The completed subassembly 20 is retained on the engine by suitable fasteners 106 received through apertures formed in the manifold upper deck 22, and cut outs formed in the edges of gasket 28, retaining plate 68 and bracket 74. Fasteners 106 then make threaded engagement with appropriately tapped holes (not shown), the engine block structure (not shown).

The present invention thus provides a novel, low cost and easy-to-fabricate and install manifold and valve assembly for an engine hydraulic valve lifter deactivation function. The valve and manifold assembly of the present invention requires only a single manifold deck which may be cast and provides for mounting of the valves directly on mounting bosses formed on the gasket, which is retained and sealed onto by a simple stamped retaining plate. The present invention thus eliminates the need for a second manifold deck and the complexity, weight and cost thereof.

Although the invention has hereinabove been described with respect to the illustrated embodiments, it will be understood that the invention is capable of modification and variation and is limited only by the following claims.

What is claimed is:

1. In combination, an electric valve and hydraulic manifold assembly for controlling de-actuation of combustion chamber valves in a multi-cylinder engine comprising:
   (a) a deckplate having (i) a supply pressure inlet port and a supply channel communicating therewith and formed on a common side of the deckplate; (ii) a plurality of control pressure inlet ports disposed in spaced arrangement on the common side of said deckplate; (iii) a plurality of control pressure outlet ports, on the common side of the deckplate, with each of the control pressure outlet ports communicating respectively with one of said control pressure inlet ports;
   (b) a gasket disposed on said common side of said deckplate and having a plurality of spaced valve inlet ports communicating with said supply channel, and a plurality of spaced transfer ports each communicating respectively with one of said control pressure inlet ports in said deckplate and a pair of ports communicating with and dividing each of said control pressure outlet ports into an intake and an exhaust valve control pressure port, said gasket having integrally formed therewith a plurality of valve mounting bosses, with each boss having a valving cavity therein communicating with one of said valve inlet ports and each of said cavities communicating with one of said transfer ports respectively;
   (c) an electrically operated valve disposed in each of said valving cavities and operable upon electrical energization to provide fluid communication between said inlet channel and said transfer port;
   (d) means operable for retaining the valve in each of said valving cavities, and for retaining and sealing said gasket over the control pressure outlet ports, the supply channel, and said supply pressure inlet ports; and,
   (e) means for providing electrical connection to the valve in each of said valving cavities.

2. The combination defined in claim 1, wherein said means for retaining said valves in each of said cavities includes a common plate received over each valve.

3. The combination defined in claim 2, wherein said means for retaining and sealing said gasket over the control pressure outlet ports, the supply channel and the supply pressure inlet ports includes a pair of superposed plates.

4. The combination defined in claim 1, wherein said gasket is formed with polyamide material having about one-third by volume of glass filler.

5. The combination defined in claim 1, wherein said deckplate is formed of aluminum material.

6. The combination defined in claim 1, wherein said deckplate includes a boss disposed on the side opposite said common side for mounting a pressure sensor.

7. The combination defined in claim 1, wherein said gasket includes portions thereof arranged to seal about the margins of said deckplate upon mounting on the engine.

8. The combination defined in claim 1, wherein said means for providing electrical connection for said valve in each of said cavities includes a common lead frame including terminals effecting electrical connection with the valve in each cavity.

9. The combination defined in claim 8, wherein said terminals effect plug-in electrical connection with the valve in each of said cavities.

10. The combination defined in claim 1, wherein said terminals include electrical leads for external electrical connection thereto.

11. The combination defined in claim 1, wherein said valve includes a means for sealing said valve in said cavity and isolating said transfer port from said control pressure inlet port.

12. The combination defined in claim 11, wherein said means for sealing comprises a pair of annular seals.

13. The combination defined in claim 1, wherein said valve is solenoid operated.

14. The combination defined in claim 1, wherein said means for retaining the valve and said gasket comprises a pair of superposed plates attached to the deckplate.

15. A method of making an electro-hydraulic assembly for controlling actuation of combustion chamber valves in a multi-cylinder engine comprising:
   (a) providing a deckplate and forming a supply channel on one side thereof and an inlet supply pressure port communicating therewith;
   (b) forming a plurality of control pressure inlet ports in spaced arrangement on the one side of the deckplate and forming a plurality of control pressure outlet ports in said one side each communicating respectively with one of said control pressure inlet ports;
   (c) disposing a one-piece gasket on said one side of the deckplate and forming separate intake and exhaust valve pressure control ports therein communicating with a common one of the control pressure outlet ports in the deckplate and forming a plurality of spaced supply ports therein with each supply port communicating with the deckplate supply channel;

(d) forming a plurality of valve mounting bosses spaced on said gasket and forming a valving cavity in each boss and disposing a valve in each of said cavities for communicating with one of the gasket supply ports and forming a transfer passage in each cavity and communicating the transfer passage respectively with one of the control pressure inlet ports in the deckplate;

(e) disposing an inlet and outlet of an electrically operated valve in each of said cavities and communicating the valve inlet with said supply port therein and the valve outlet with said transfer port therein; and, (f) compressing said gasket on said deckplate and sealing over said supply channel, said control pressure inlet ports and said control pressure outlet ports and retaining said valves on said bosses and electrically connecting to each of the valves.

16. The method defined in claim 15, wherein the step of disposing the inlet and outlet of a valve includes disposing an annular seal in said cavity.

17. The method defined in claim 15, wherein the step of retaining said valves includes disposing a plurality of spacers between the lead frame and the gasket.

18. The method defined in claim 17, wherein the step of retaining said valves includes disposing a fastener through each of the spacers.

19. The method defined in claim 15, wherein the step of disposing a one-piece gasket includes forming a gasket having polyamide material therein.

20. The method defined in claim 15, wherein the step of forming a gasket includes forming a gasket having polyamide material filled about one-third by volume with glass material.

21. The method defined in claim 15, wherein the step of providing a deckplate includes forming a boss on the side opposite said one side and disposing a pressure sensor in said boss.

22. The method defined in claim 15, wherein the step of electrically connecting to each of the valves includes plug-in connecting.

* * * * *